(12) United States Patent
Thikkireddy et al.

(10) Patent No.: US 10,284,861 B2
(45) Date of Patent: May 7, 2019

(54) CONCURRENT IMAGE COMPRESSION AND THUMBNAIL GENERATION

(71) Applicant: Advanced Micro Devices, Inc., Sunnyvale, CA (US)

(72) Inventors: Mahalakshmi Thikkireddy, Hyderabad (IN); Sateesh Lagudu, Hyderabad (IN)

(73) Assignee: Advanced Micro Devices, Inc., Santa Clara, CA (US)

( * ) Notice: Subject to any disclaimer, the term of this patent is extended or adjusted under 35 U.S.C. 154(b) by 86 days.

(21) Appl. No.: 15/414,466

(22) Filed: Jan. 24, 2017

(65) Prior Publication Data

US 2018/0167622 A1    Jun. 14, 2018

(30) Foreign Application Priority Data

Dec. 9, 2016  (IN) .............................. 201641042223

(51) Int. Cl.

| H04N 19/176 | (2014.01) |
|---|---|
| H04N 19/136 | (2014.01) |
| H04N 19/182 | (2014.01) |
| H04N 19/423 | (2014.01) |
| H04N 19/625 | (2014.01) |
| H04N 19/80 | (2014.01) |

(52) U.S. Cl.
CPC ......... *H04N 19/176* (2014.11); *H04N 19/136* (2014.11); *H04N 19/182* (2014.11); *H04N 19/423* (2014.11); *H04N 19/625* (2014.11); *H04N 19/80* (2014.11)

(58) Field of Classification Search
CPC ....... H04N 19/17; H04N 5/772; G06K 7/1443
See application file for complete search history.

(56) References Cited

U.S. PATENT DOCUMENTS

| 6,545,687 B2 | 4/2003 | Scott et al. |
| 8,179,452 B2 | 5/2012 | Kim et al. |
| 8,320,685 B2 | 11/2012 | Ozaki et al. |
| 9,350,883 B2 | 5/2016 | Ichikawa |
| 2010/0103284 A1* | 4/2010 | Sugimori ........... H04N 5/23209 348/231.3 |
| 2011/0025869 A1 | 2/2011 | Lee |

(Continued)

FOREIGN PATENT DOCUMENTS

KR   10-2009-0076022 A    7/2009

OTHER PUBLICATIONS

International Search Report and Written Opinion dated Mar. 30, 2018 for PCT Application No. PCT/US2017/065002, 13 pages.

*Primary Examiner* — Phuoc Tran

(57) ABSTRACT

A first memory stores values of blocks of pixels representative of a digital image, a second memory stores partial values of destination pixels in a thumbnail image, and a third memory stores compressed images and thumbnail images. A processor retrieves values of a block of pixels from the first memory. The processor also concurrently compresses the values to generate a compressed image and modify a partial value of a destination pixel based on values of pixels in portions of the block that overlap a scaling window for the destination pixel. The processor stores the modified partial value in the second memory and stores the compressed image and the thumbnail image in the third memory.

20 Claims, 10 Drawing Sheets

(56) References Cited

U.S. PATENT DOCUMENTS

| | | | |
|---|---|---|---|
| 2013/0215295 A1* | 8/2013 | Baek | H04N 5/23293 348/240.99 |
| 2015/0187084 A1 | 7/2015 | Wang et al. | |
| 2015/0341559 A1* | 11/2015 | Kelder | G11B 27/031 348/220.1 |

* cited by examiner

CONCURRENT IMAGE COMPRESSION AND THUMBNAIL GENERATION

BACKGROUND

Digital images captured by stand-alone digital cameras or digital cameras that are incorporated into other devices such as smart phones and tablets can be compressed using compression algorithms such as the Joint Photographic Experts Group (JPEG) compression algorithm. Digital cameras include arrays of detectors to generate signals that represent the color and intensity of light received by the detectors. The signals are converted to one or more bytes of information to represent the color and intensity of each pixel of an original digital image. Compression algorithms are then used to compress the blocks in the original digital image. For example, the JPEG compression algorithm compresses a block of pixels (such as a 16×16 minimum coded unit, MCU) from the original digital image by applying a discrete cosine transform (DCT) to generate frequency components that represent the values of the pixels in the block. The human eye is less sensitive to the higher frequency components, which can therefore be discarded or stored at a lower accuracy than the lower frequency components, thereby compressing the block. Additional lossless compression, such as Huffman encoding, is then applied to further compress the information representative of a portion of the image associated with the block. Compressing a digital image therefore requires retrieving every pixel in the image from a main memory in successive blocks.

The original digital image can also be downscaled to produce a thumbnail image that is suitable for display as an icon, e.g., to provide a visual representation of the image in a computer filing system. Downscaling reduces the number of pixels that represent the original digital image to form the thumbnail image. In order to generate a plausible representation of the original digital image, downscaling algorithms combine interpolated values of multiple pixels in the original digital image to estimate a value for each pixel in the thumbnail image. Examples of interpolation algorithms include nearest-neighbor interpolation, bilinear interpolation, bicubic interpolation, and the like. Downscaling is typically performed by fetching lines of pixels from the original digital image stored in the main memory and storing each line in a local image buffer. The interpolation algorithm is then used to calculate the contribution of each pixel in the buffered line to a corresponding pixel in the thumbnail image. Thus, generating a thumbnail image requires retrieving every pixel in the image from the main memory in successive lines.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
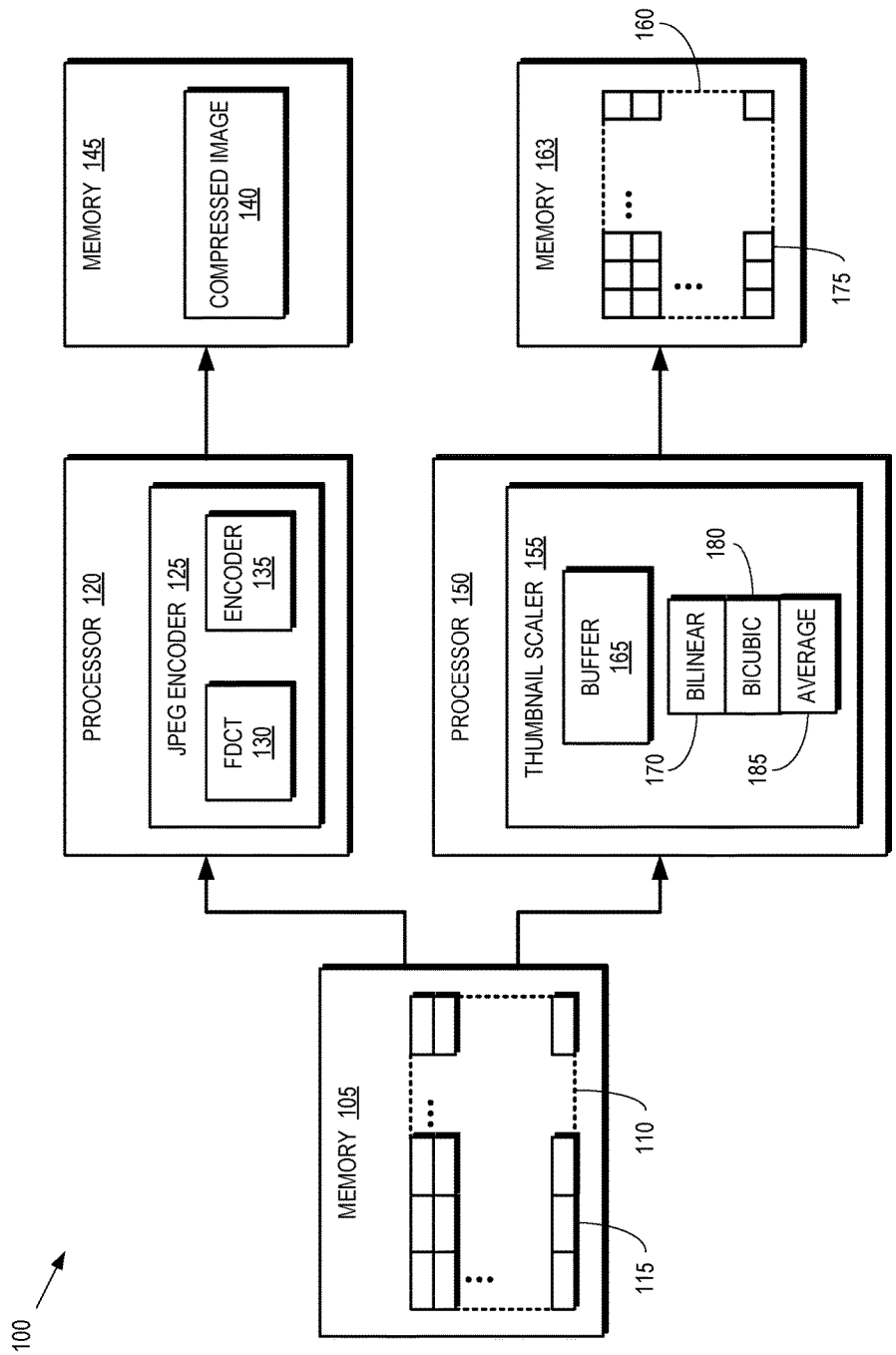
FIG. 1 is a block diagram of a processing system for performing image compression and downscaling of the image to form a thumbnail image according to some embodiments.

Image processing systems implemented in digital cameras, smart phones, tablets, laptop computers, desktop computers, and the like typically perform both JPEG compression of a digital image and downscaling of the digital image to produce a corresponding thumbnail image. However, conventional JPEG compression and conventional downscaling access the pixels in a digital image in different formats. For example, conventional JPEG compression accesses the pixel values in blocks to support discrete cosine transform (DCT) compression algorithms and conventional downscaling accesses the pixel values line-by-line to support storing the pixel values in a line buffer. Conventional downscaling cannot be performed on blocks of pixels if the source image windows that define the pixels that are used to derive a destination pixel in the thumbnail image are spread across multiple blocks. This problem is exacerbated for larger scaling ratios between the source image and the thumbnail image. Consequently, two separate passes over the pixels of the original digital image stored in the main memory are required to retrieve the pixel values to perform both JPEG compression and downscaling. Each pass consumes memory bandwidth and power.

The memory bandwidth and power consumed by image compression and downscaling are reduced by retrieving values of pixels representative of a digital image in a single pass through a system memory (or cache for the system memory) used to store the values of the pixels and then using the retrieved values of the pixels to generate both a compressed image and a downscaled thumbnail image. Thus, each pixel value is only retrieved from the system memory or cache a single time, instead of the two retrievals (one for each pass) required to perform conventional JPEG compression and downscaling. Generating the compressed image and the downscaled thumbnail image from the pixel values retrieved in the single pass reduces the memory bandwidth and power consumption by as much as half relative to the two passes required to retrieve the pixel values in the conventional practice.

In some embodiments, values of the pixels that represent a digital image are retrieved from the system memory or cache in blocks (such as MCUs) and JPEG compression is performed on the values of the pixels in the blocks. Concurrently with compressing pixel values in a block, values of destination pixels in a thumbnail image are generated by comparing boundaries of the block to boundaries of scaling windows for the destination pixels. Values of a portion of the pixels in the block that are within a scaling window of a destination pixel are interpolated to the location of the destination pixel and the interpolated values are accumulated to form a partial value of the destination pixel. The partial value is stored in a local memory (such as a random access memory, RAM) if the current block overlaps a portion of the scaling window or if the scaling window is spread over multiple neighboring blocks. The partial value is restored from the local memory in response to the scaling window overlapping with a subsequently retrieved block of pixels and accumulated with values of pixels in the subsequently retrieved block. For example, the values of a portion of the pixels in the subsequently retrieved block that are within the scaling window are interpolated to the location of the destination pixel. The interpolated values are then accumulated in the partial value of the destination pixel. A final value of the destination pixel is determined based on the partial value once the entirety of the scaling window has overlapped with one or more retrieved blocks of pixels.

FIG. 1 is a block diagram of a processing system 100 for performing image compression and downscaling of the image to form a thumbnail image according to some embodiments. The processing system 100 includes a memory 105 that stores information representative of an image 110. The memory 105 is implemented as a system memory or cache that stores the image 110 in blocks 115 (only one indicated by a reference numeral in the interest of clarity). For example, the image 110 can be represented by an array of pixels such as a 256×256 array of pixels. Each of the blocks 115 in the image 110 is represented by a subset of the pixels such as a 16×16 pixel minimum coded unit, MCU. Thus, the image 110 can be subdivided for representation as a 16×16 array of blocks 115. The image 110 can also be subdivided for representation as 256 lines that each include 256 pixels.

The processing system 100 includes a processor 120 that is used to implement an encoder 125 such as a Joint Photographic Experts Group (JPEG) encoder 125, which implements a compression algorithm for compressing the image 110. In the illustrated embodiment, the JPEG encoder 125 includes a forward discrete cosine transform (FDCT) module 130 that applies an FDCT compression algorithm that converts the image 110 from a spatial (two-dimensional, 2-D) domain into a frequency domain signal that represents the image 110 as a set of frequency components having different amplitudes. The FDCT module 130 discards high-frequency components of the frequency domain signal, thereby compressing the representation of the image 110. Compressing the image by discarding high-frequency components is a lossy compression technique because some information is lost in the compression. The amount of compression, e.g., the number of high frequency components that are discarded, is determined by a compression ratio.

The frequency domain representation of the image 110 is further compressed using a lossless compression algorithm implemented in an encoder 135. For example, the encoder 135 can implement Huffman encoding to encode the frequency domain representation of the image 110 using a variable length code table that is derived based on an estimated frequency or probability of occurrence of different values in the frequency domain representation. The encoder 135 produces a compressed image 140, which is stored in a memory 145. In some embodiments, the memory 145 is the same system memory or cache that is used to implement the memory 105. However, the memories 105, 145 can also be implemented as different memory elements or caches.

At least in part because the FDCT module 130 converts the values of the pixels representative of the image 110 from a 2-D domain into the frequency domain, the FDCT module 130 requires that the values of the pixels in the image 110 be retrieved on a block-by-block basis from the memory 105. For example, the JPEG encoder 125 retrieves a block 115 from the memory 105 and then the FDCT module 130 converts the values of the pixels in the block 115 into a frequency domain representation of the block 115 for compression by discarding high-frequency components of the frequency domain representation. The blocks 115 of the image 110 are retrieved from the memory 105 over an interface, which can be implemented with elements including a memory access controller, a memory physical layer interface, one or more buses or bridges, and the like. The interface has a limited memory bandwidth that is (at least partially) allocated for retrieval of the blocks 115. Furthermore, retrieving the blocks 115 over the interface consumes power and introduces latency into the compression process.

The processing system 100 also includes a processor 150, which can be the same or different than the processor 120. The processor 150 implements a thumbnail scaler 155 that is used to generate a thumbnail image 160 from the values of the pixels in the image 110. The thumbnail image 160 is stored in a memory 163. The thumbnail scaler 155 retrieves values of pixels from the image 110 on a line-by-line basis and stores each line of pixels in a buffer 165. For example, the thumbnail scaler 155 can retrieve a line of 256 pixels from the memory 105 and store the line in the buffer 165. In the illustrated embodiment, the thumbnail scaler 155 implements a bilinear interpolation module 170 to estimate a contribution of each pixel in the line to a destination pixel (such as the destination pixel 175) in the thumbnail image by interpolating the value of the pixel in the line to the location of the destination pixel. The thumbnail scaler 155 also implements a bicubic interpolation module 180 to estimate contributions of pixels in the line to the destination pixel 175. An averaging module 185 is then used to average the values produced by the bilinear interpolation module 170 and the bicubic interpolation module 180 to produce a final value of the destination pixel 175.

At least in part because the thumbnail scaler 155 retrieves values of the pixels from the image 110 on a line-by-line basis for storage in the buffer 165, the line-by-line scan of the image 110 is performed by the thumbnail scaler 155 in addition to the block-by-block scan of the image 110 performed by the JPEG encoder 125. The thumbnail scaler 155 retrieves the lines from the memory 105 over an interface, which can be implemented with elements including a memory access controller, a memory physical layer interface, one or more buses or bridges, and the like. Thus, the additional scan performed by the thumbnail scaler 155 approximately doubles the memory bandwidth consumption because the same image 110 is fetched twice to perform compression and downscaling. Furthermore, retrieving the values of the pixels in the image 110 in two passes approximately doubles the power consumption needed to perform compression and downscaling, and can also increase the latency.

Figure 2:
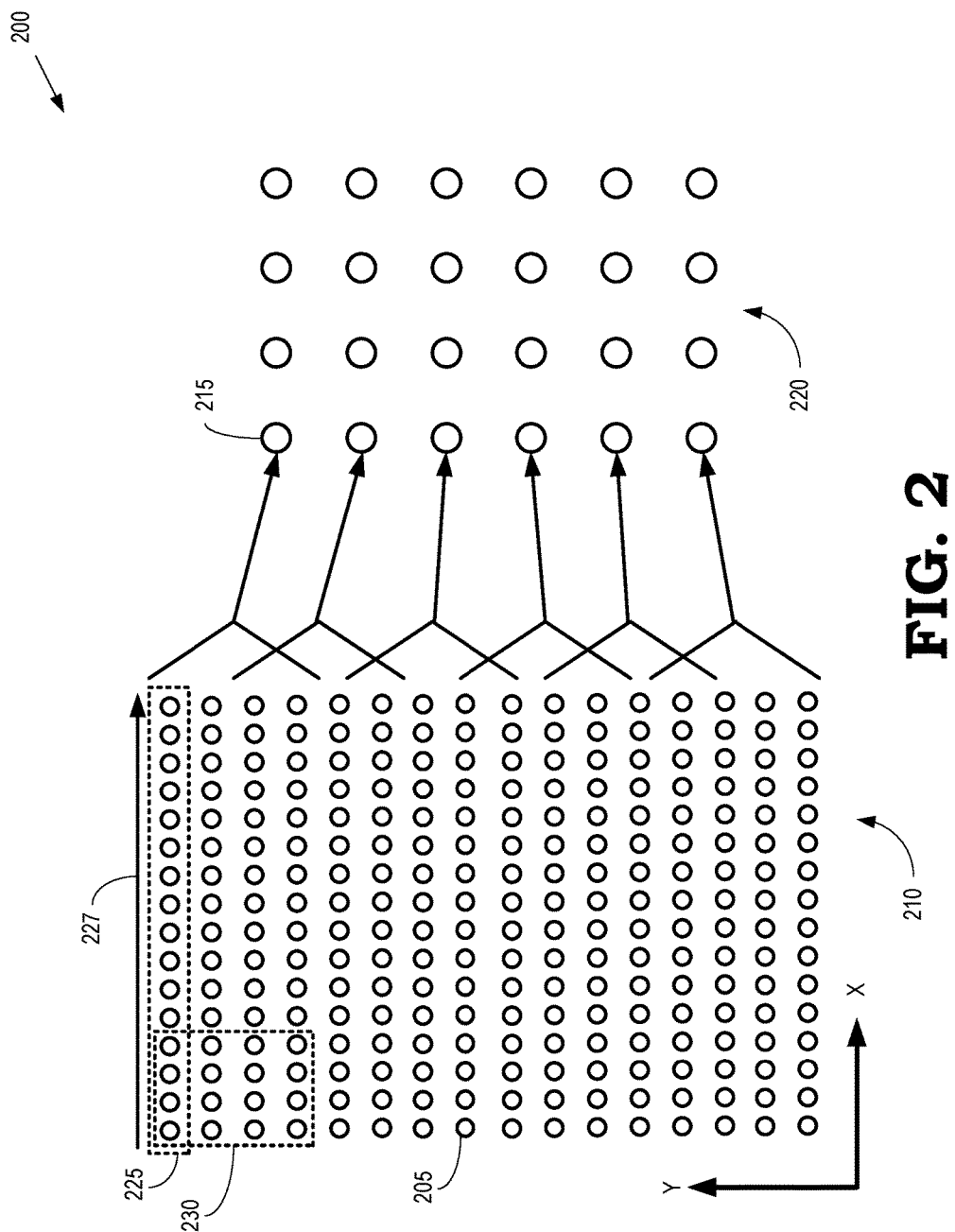
FIG. 2 is a diagram of a mapping used to interpolate pixel values in an image to determine values of destination pixels in a thumbnail image according to some embodiments.

FIG. 2 is a diagram of a mapping 200 used to interpolate pixel values in an image to determine values of destination pixels in a thumbnail image according to some embodiments. The mapping 200 relates values of pixels 205 (only one indicated by a reference numeral in the interest of clarity) in a block 210 that represents a subset of the pixels in a larger image (not shown in FIG. 2) to destination pixels 215 (only one indicated by a reference numeral in the interest of clarity) that represent a thumbnail image 220. In the illustrated embodiment, the block 210 includes a subset of the pixels in a 16×16 pixel minimum coded unit (MCU) that is a portion of an image that is represented by a 256×256 array of pixels. In the illustrated embodiment, the thumbnail image 220 a 4×6 array of destination pixels 215 so that the downscaling ratio between the block 210 and the thumbnail image 220 is 3.99×2.66.

Downscaling is performed by fetching lines of pixels such as the line 225 from the block 210 (as indicated by the arrow 227) and storing the fetched line 225 in a line buffer such as the buffer 165 shown in FIG. 1. Groups of the pixels 205 are associated with corresponding destination pixels 215. For example, the group 230 is associated with the destination pixel 215. The values of the pixels 205 in the group 230 each provide a contribution to the value of the destination pixel 215. The contribution of each of the pixels 205 to the value of the destination pixel 215 is determined by interpolating from the locations of the pixels 205 to the location of the destination pixel 215.

In some embodiments, a FANT algorithm can be used to determine contributions to values of the destination pixel 215 based on offsets in the X direction and Y direction. The contribution ($Dest_{pel}$) can be represented as:

$$Dest_{pel} = \sum_{y=0}^{vscl\_ratio} \sum_{x=0}^{hscl\_ratio} P[y][x] * xportion * yportion$$

where P[y][x] is the value of the source pixel at the location (x, y), xportion is the distance from the nearest left integer pixel in the X direction, yportion is the distance from the nearest top integer pixel in the Y direction, x varies from zero to hscal_ratio in the X direction over the pixels 205 in the group 230, and y varies from zero to vscl_ratio in the Y direction over the pixels 205 in the group 230. Generally speaking, bilinear, bicubic, and FANT averaging algorithms are interpolation techniques that can be used to interpolate to a value of the destination pixel using a pixels contained in the scaling window. For example, destination pixel 215 can be interpolated using the block of the pixels in a scaling window 230.

The area cost required to implement the line buffer is high and increases in proportion to the size of the group, e.g., in proportion to hscal_ratio or yscal_ratio. Fetching the lines 225 from the system memory or cache consumes bandwidth of the interface to the system memory or cache. Furthermore, the power consumed to generate the thumbnail image 220 by downscaling the block 210 increases as the size of the line buffer is increased and also increases as the amount of memory bandwidth consumed by fetching the lines 225 increases. The overall power consumption can be reduced, while eliminating the need for a line buffer, by performing JPEG encoding and thumbnail downscaling using a single pass over the source image instead of a first, block-by-block pass to perform JPEG encoding and a second, line-by-line pass to perform the thumbnail downscaling.

Figure 3:
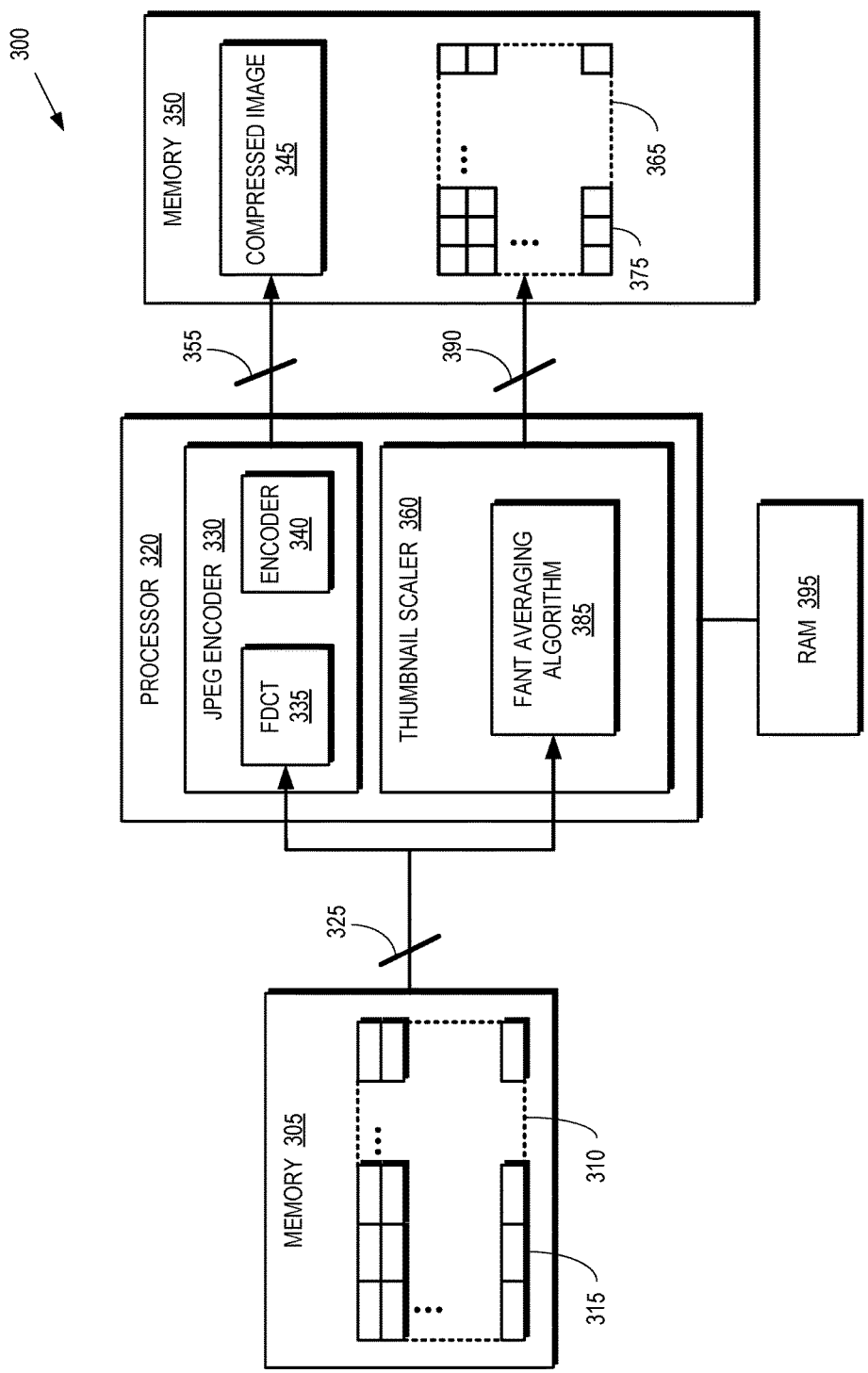
FIG. 3 is a block diagram of a processing system for performing image compression and downscaling of an image to form a thumbnail image using a single pass to access data in the image according to some embodiments.

FIG. 3 is a block diagram of a processing system 300 for performing image compression and downscaling of the image to form a thumbnail image using a single pass to access data in the image according to some embodiments. The processing system 300 includes a memory 305 that stores information representative of an image 310. The memory 305 is implemented as a system memory or cache that stores the image 310 in blocks 315 (only one indicated by a reference numeral in the interest of clarity). For example, the image 310 can be represented by an array of pixels such as a 256×256 array of pixels. Each of the blocks 315 in the image 310 is represented by a subset of the pixels such as a 16×16 pixel MCU. Thus, the image 310 can be subdivided for representation as a 16×16 array of blocks 115.

The memory 305 is connected to a processor 320 by an interface 325. Some embodiments of the interface 325 provide a limited amount of memory bandwidth for communicating information between the memory 305 and the processor 320. For example, the interface 325 can be implemented using a memory access controller, a memory physical layer interface, one or more buses, one or more bridges, or other hardware elements that are constrained to provide an amount of memory bandwidth determined by the characteristics of the hardware elements. Using the interface 325 to convey information between the memory 305 and the processor 320 consumes an amount of power that increases as the amount of information conveyed over the interface 325 increases.

The processor 320 implements an encoder 330 such as a JPEG encoder 330, which implements a compression algorithm for compressing the image 310. In the illustrated embodiment, the JPEG encoder 330 includes an FDCT module 335 that applies an FDCT compression algorithm that converts the image 310 from a spatial (2-D) domain into a frequency domain signal that represents the image 310 as a set of frequency components having different amplitudes. The FDCT module 335 discards high-frequency components of the frequency domain signal, thereby compressing the representation of the image 310, as discussed herein. The frequency domain representation of the image 310 is further compressed using a lossless compression algorithm implemented in an encoder 340. For example, the encoder 340 can implement Huffman encoding to encode the frequency domain representation of the image 310, as discussed herein.

The encoder 340 produces a compressed image 345, which is stored in a memory 350 that is connected to the processor 320 by an interface 355, which can be implemented using combinations of hardware elements including memory controllers, memory physical layer interfaces, buses, bridges, and the like. The interface 355 therefore has a limited bandwidth for conveying information between the processor 320 and the memory 350. In some embodiments, the memory 350 is the same system memory or cache that is used to implement the memory 305, in which case the interface 355 is the same as the interface 325. However, the memories 305, 350 can also be implemented as different memory elements or caches that are connected to the processor 320 by different interfaces 325, 355.

The processor 320 also implements a thumbnail scaler 360 that is used to generate a thumbnail image 365 from the values of the pixels in the image 310. In the illustrated embodiment, the thumbnail scaler 360 implements FANT averaging algorithm 385 to perform an accumulation of pixels and averaging over a given scaling window. The value of a destination pixel 375 is determined by input pixels in a given scaling window (HSCL×VSCL) within the block 310.

Thus, all the input source pixels 315 are accounted for and contribute to the values of the destination pixel 375 in the thumbnail picture 365. If the scaling ratio is fractional, i.e. scaling window boundaries falls in-between the integer indexed pixels 315, the partial source pixels 315 that fall within the boundary of the scaling window contribute to the value of the corresponding destination pixel 375. This minimizes the aliasing effects across the scaling window boundaries. Values of the destination pixels 375 are conveyed over an interface 390 to the memory 350. The interface 390 is implemented using combinations of hardware elements including memory controllers, memory physical layer interfaces, buses, bridges, and the like. The interface 390 therefore has a limited bandwidth for conveying information between the processor 320 and the memory 350. Some embodiments of the interface 390 are the same as the interface 355.

The processor 320 is associated with a local memory that can be implemented as a random access memory (RAM) 395. The RAM 395 can be implemented within the processor 320 or proximate to the processor 320 so that the access latency, memory bandwidth, and power consumption needed to convey information between the processor 320 and the local RAM 395 is small (and in some cases is negligible) compared to the access latency, memory bandwidth, and power consumption needed to convey information over the interfaces 325, 355, 390.

The processor 320 fetches block 315 from the image 310 stored in the memory 305 over the interface 325 on a block-by-block basis. The JPEG encoder 330 and the thumbnail scaler 360 operate concurrently on the fetched blocks to generate the compressed image 345 and the thumbnail image 365, respectively. For example, the processor 320 can retrieve values of the pixels in the block 315 from the memory 305. The JPEG encoder 330 applies a compression algorithm to the values to generate the compressed image 345 and the thumbnail scaler 360 modifies, concurrently with operation of the JPEG encoder 330 on the values of the pixels in the block 315, a partial value of a destination pixel 375 based on values of pixels in portions of the block 315 that overlap a scaling window for the destination pixel 375. The thumbnail scaler 360 can store the modified partial value in a local memory associated with the processor 320 such as the RAM 395. The thumbnail scaler 360 can also retrieve the modified partial value from the RAM 395 when operating on other blocks in the image 310, as discussed herein. The JPEG encoder 330 stores the compressed image 345 in the memory 350 after compressing the block 315. The thumbnail scaler 360 stores completed thumbnail images 365 in the memory 350, as discussed herein.

Figure 4:
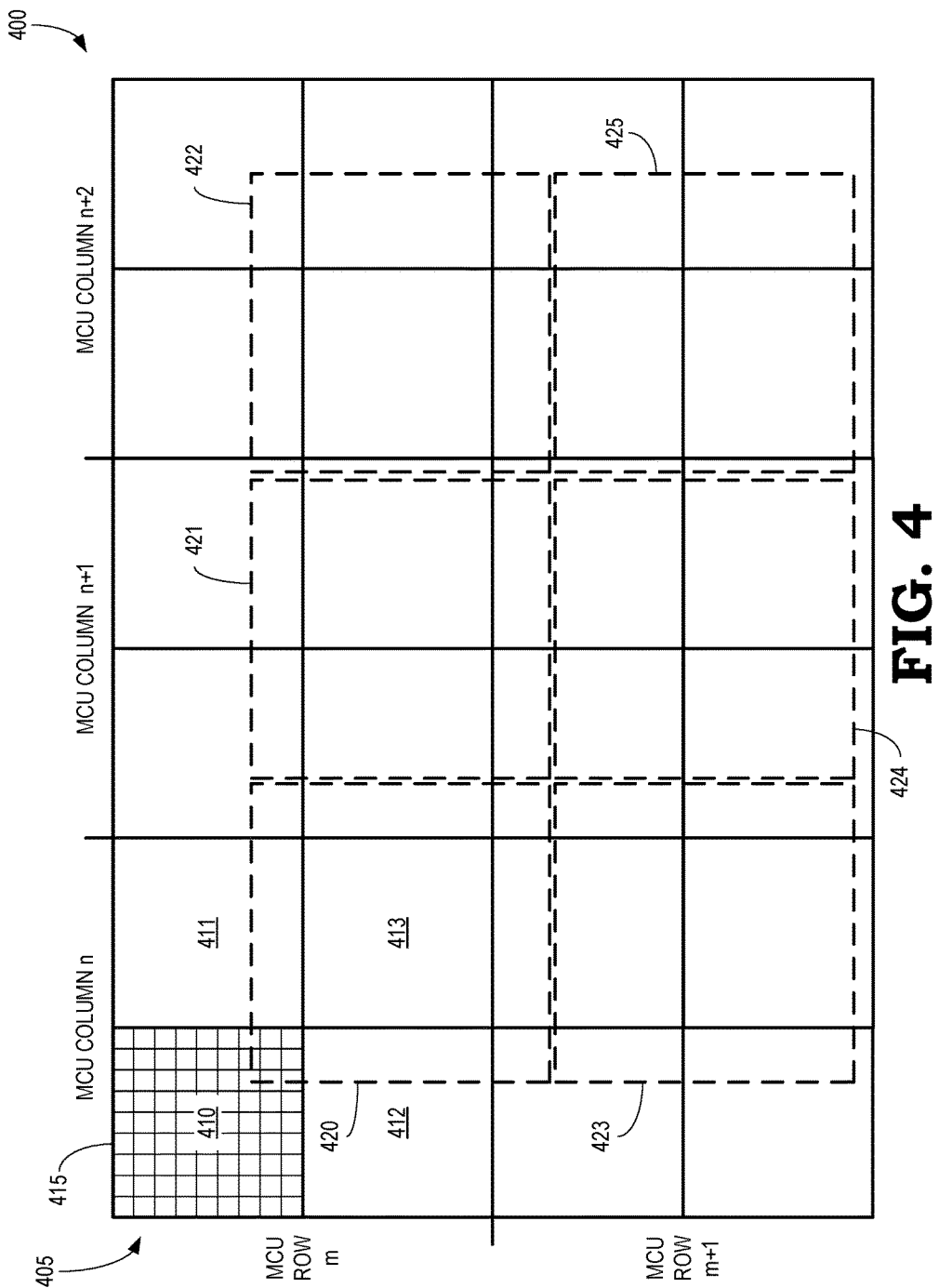
FIG. 4 is a diagram of a portion of an image that includes a set of MCUs organized in columns and rows according to some embodiments.

FIG. 4 is a diagram of a portion 400 of an image that includes a set of MCUs organized in columns and rows according to some embodiments. The image is divided into M rows and N columns of MCUs. For example, the image can include 16 rows and 16 columns as illustrated by the image 310 shown in FIG. 3. The portion 400 includes a subset of the MCUs that are identified by a subset of the rows (m, m+1) and a subset of the columns (n, n+1, n+2). For example, the MCU 405 is identified by the row/column pair (m, n). Each of the MCUs are further subdivided into four data units. For example, the MCU 405 is subdivided into the data units 410, 411, 412, 413, which are collectively referred to herein as "the data units 410-413." Each of the data units includes a block of pixels. For example, the data unit 410 includes an 8×8 block of pixels including the pixel 415. As discussed herein, values of the pixels in the MCUs are retrieved from a system memory or cache (such as the memory 305 shown in FIG. 3) and concurrently compressed and downscaled to form a thumbnail image on a block-by-block basis.

Scaling windows 420, 421, 422, 423, 424, 425 (collectively referred to herein as "the scaling windows 420-425") are associated with destination pixels in a thumbnail image that is produced by downscaling the image including the portion 400. The scaling windows 420-425 overlap and encompass pixels in the portion 400 that contribute to the corresponding destination pixel in the thumbnail image. For example, the scaling window 420 encompasses pixels in the data units 410-413 of the MCU 405, as well as pixels in the MCUs identified by the row/column pairs (m, n+1), (m+1, n), (m+1, n+1). Dimensions of the scaling windows 420-425 are determined by a scaling ratio or separate horizontal and vertical scaling ratios, as discussed herein. Some embodiments of the scaling ratios are fractional so that the boundaries of the scaling windows 420-425 can fall between pixels that are indexed by integer values. In that case, partial source pixels that fall within the boundaries of the scaling windows 420-425 are included in the calculation of the value of the corresponding destination pixels in the thumbnail image.

The final values of the destination pixels associated with the scaling windows 420-425 are not determined by values of pixels in a single block since the scaling windows 420-425 overlap multiple blocks. Instead, partial values of the destination pixels are therefore determined on a block-by-block basis. For example, a partial value of the destination pixel associated with the scaling window 420 is determined by interpolating values of the pixels in the data units 410-413 concurrently with compressing the values of the pixels in the MCU 405. The partial value is then stored in a local memory in response to detecting a boundary of the MCU 405. Thus, both the interpolation of the pixel values in the MCU 405 used for downscaling to generate the thumbnail image and compression of the pixel values in the MCU 405 can be performed using the values retrieved in a single scan from the system memory or cache.

Once processing of the MCU 405 is complete, another MCU can be retrieved from the system memory or cache. For example, the values of the pixels in the MCU (m, n+1) can be retrieved from the system memory or cache in response to completing downscaling and compression of the MCU 405. Partial values of destination pixels associated with scaling windows that overlap with the retrieved MCU can be created or retrieved from the local memory. For example, the partial value of the destination pixel associated with the scaling window 420 is retrieved from the local memory in response to retrieving the MCU (m, n+1) from the system memory or cache. For another example, a partial value of the destination pixel associated with the scaling window 421 can be created in response to retrieving the MCU (m, n+1). Contributions of the pixels encompassed by the scaling windows 420, 421 are then interpolated and accumulated in the corresponding partial values, which can be stored in the local memory in response to detecting a boundary of the scaling windows 420, 421 or the MCU (m, n+1).

A final value of a destination pixel is determined in response to interpolating values of the pixels encompassed by an entirety of the corresponding scaling window. For example, the final value of the destination pixel associated with the scaling window 420 is determined in response to reaching the boundary of the scaling window 420 at the bottom right corner while processing the MCU (m+1, n+1). The final value of the destination pixel is stored in an external memory, which can be the same memory as the system memory or cache that is used to store the portion 400 of the image or a different memory.

Figure 5:
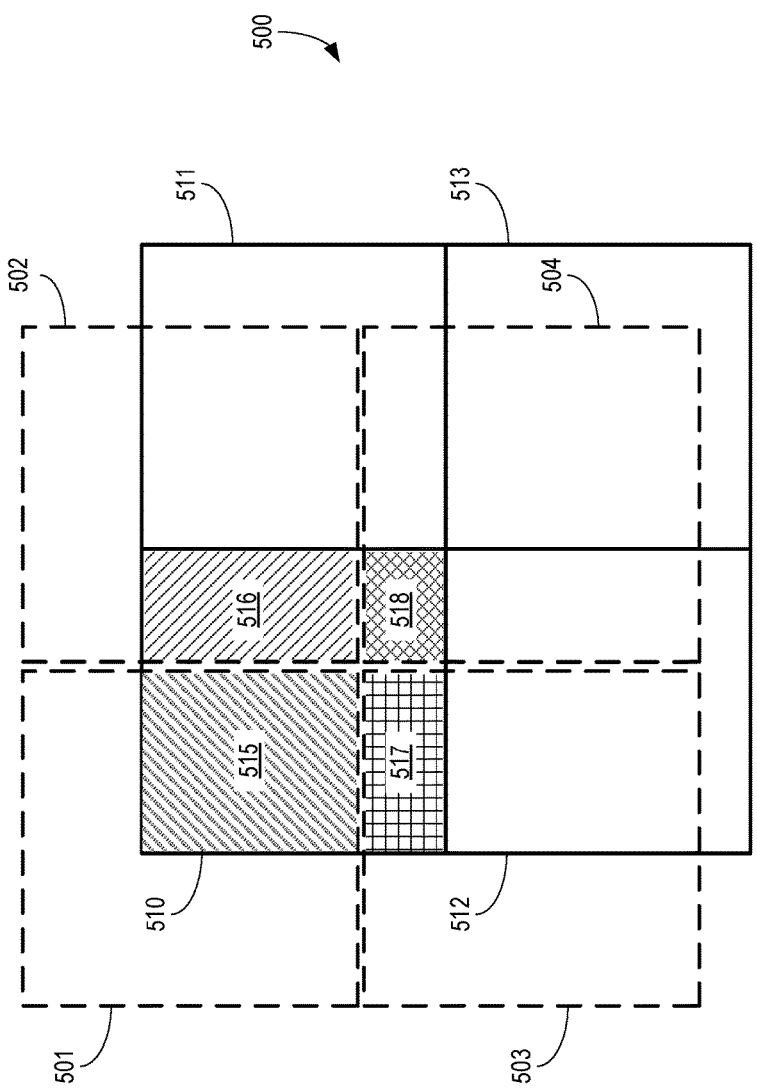
FIG. 5 is a diagram of an MCU that is overlapped by scaling windows associated with destination pixels in a thumbnail image according to some embodiments.

FIG. 5 is a diagram of an MCU 500 that is overlapped by scaling windows 501, 502, 503, 504 associated with destination pixels in a thumbnail image according to some embodiments. The MCU 500 is subdivided into data units 510, 511, 512, 513, which are collectively referred to herein as "the data units 510-513." The scaling windows 501, 502, 503, 504 (collectively referred to herein as "the scaling windows 501-504") encompass different portions 515, 516, 517, 518 (collectively referred to herein as "the portions 515-518") of the data unit 510, as well as portions of other data units including the data units 511-513.

Partial values of destination pixels associated with the scaling windows 501-504 are accumulated on a block-by-block basis by computing the contributions of pixels within a portion of the block encompassed by the corresponding scaling window 501-504, storing the partial value in a local memory once all the contributions from the current block have been accumulated, restoring the partial value from the local memory in response to retrieving a new block that is at least partially encompassed by a corresponding scaling window 501-504, and accumulating contributions of pixels within a portion of the newly retrieved block.

In some embodiments, partial values are stored in local memory in response to detecting boundaries of the portions 515-518. For example, a partial value of the destination pixel associated with the scaling window 502 is retrieved from the local memory in response to retrieving the data unit 510 in the MCU 500 from the system memory or cache. Contributions from the pixels in the portion 516 of the data unit 510 are accumulated in the partial value, which is stored in the local memory in response to detecting a boundary of the portion 516. Partial values of the destination pixels associated with the scaling windows 502-504 are also stored in the local memory in response to detecting boundaries of the scaling windows 502-504 within the data unit 510.

In some embodiments, final values of the destination pixels are stored in system memory in response to detecting boundaries of the scaling windows 501-504 that indicate that all the contributions of pixels to the corresponding destination pixels have been computed. For example, a partial value of the destination pixel associated with the scaling window 501 is retrieved from the local memory in response to retrieving the data unit 510 in the MCU 500 from the system memory or cache. The last pixel that contributes to the destination pixel is at the lower right-hand corner of the portion 515 of the data unit 510 and so the final value of the destination pixel is determined once the pixels in the portion 515 have been processed. The final value of the destination pixel for the scaling window 501 is therefore stored in the system memory in response to detecting the boundary of the scaling window 501 during processing of the data unit 510.

Figure 6:
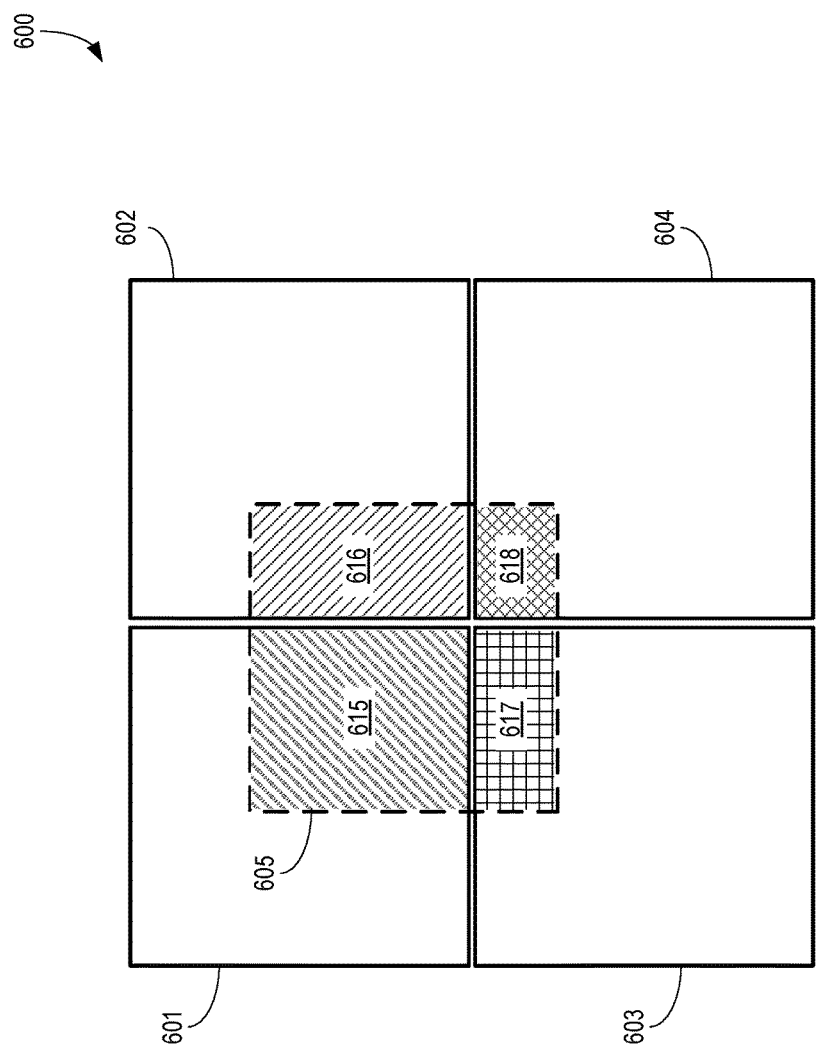
FIG. 6 is a diagram of an MCU including a set of data units that are overlapped by a scaling window associated with a destination pixel in a thumbnail image according to some embodiments.

FIG. 6 is a diagram of an MCU 600 including a set of data units 601, 602, 603, 604 that are overlapped by a scaling window 605 associated with a destination pixel in a thumbnail image according to some embodiments. The data units 601, 602, 603, 604 are collectively referred to herein as "the data units 601-604." The scaling window 605 encompasses pixels in a portion 615 in the data unit 601, a portion 616 in the data unit 602, a portion 617 the data unit 603, and a portion 618 in the data unit 604. In the illustrated embodiment, the data units 601-604 are retrieved from system memory in a Z-pattern so that they are retrieved in the order indicated by the numerical order of the reference numerals 601-604.

A partial value of the destination pixel associated with the scaling window 605 is generated in response to retrieving the data unit 601 from the system memory or cache. Values of the pixels in the portion 615 are interpolated to the location of the destination pixel and the interpolated values are accumulated in the partial value, which is stored in a local memory in response to detecting a boundary in the portion 615 or the data unit 600 and one. The partial value is restored from the local memory in response to retrieving the data units 602, 603 from the system memory and values of pixels in the portions 616, 617 are interpolated and accumulated in the partial value, which is stored in the local memory in response to detecting boundaries in the data units 602, 603 or the portions 616, 617. The partial value is restored from the local memory in response to retrieving the data unit 604 from the system memory and values of pixels in the portion 618 are interpolated and accumulated in the partial value, which is used to determine the final value in response to detecting a boundary in the portion 618. For example, the final value of the destination pixel can be set equal to a sum of the partial values contributed by pixels in the portions 615-618 and then the sum can be divided by the total number of pixels within the scaling window 605.

Figure 7:
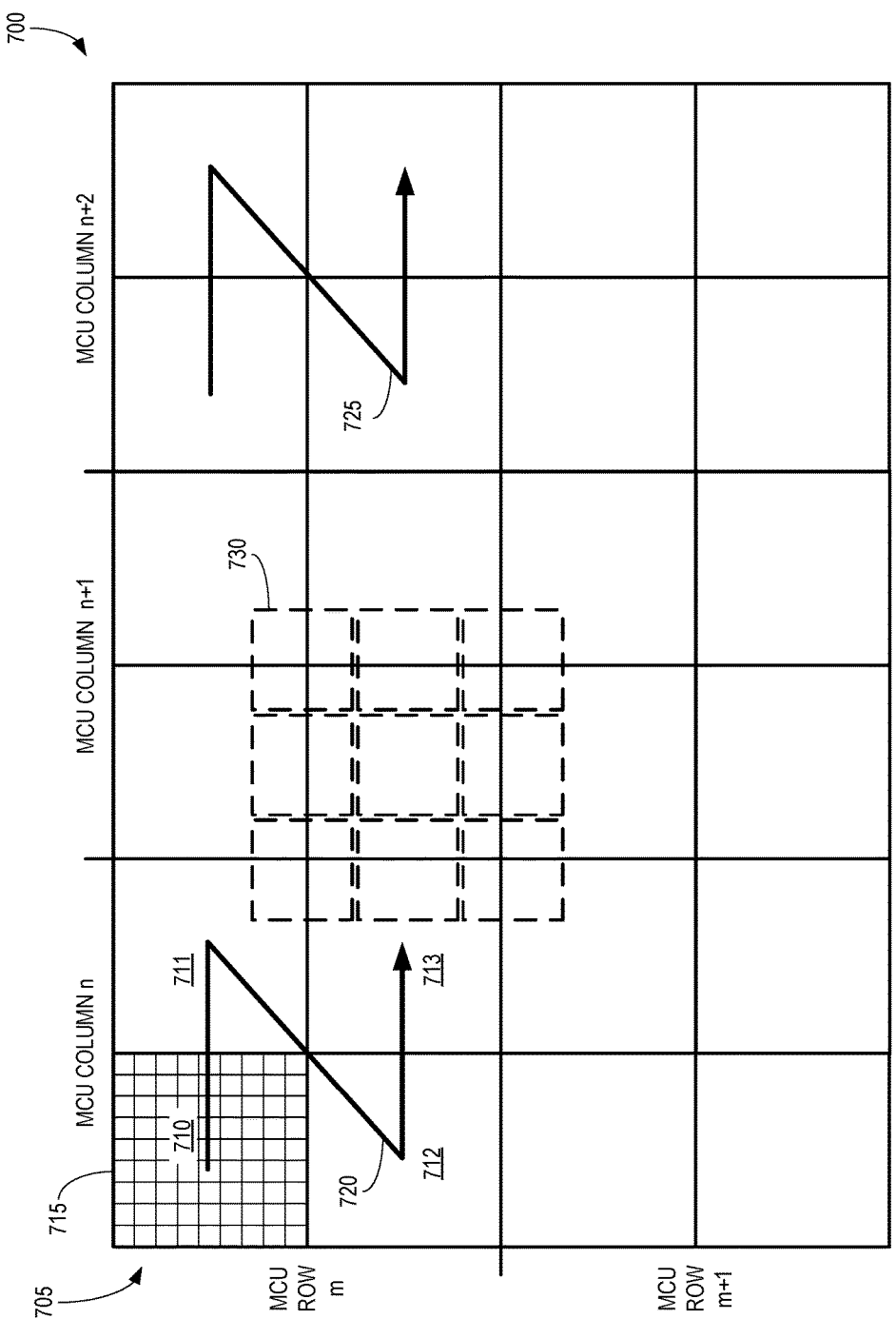
FIG. 7 is a diagram of a portion of an image that illustrates an access pattern for a set of MCUs organized in columns and rows according to some embodiments.

FIG. 7 is a diagram of a portion 700 of an image that illustrates an access pattern for a set of MCUs organized in columns and rows according to some embodiments. The image is divided into M rows and N columns of MCUs. For example, the image can include 16 rows and 16 columns as illustrated by the image 310 shown in FIG. 3. The portion 700 includes a subset of the MCUs that are identified by a subset of the rows (m, m+1) and a subset of the columns (n, n+1, n+2). For example, the MCU 705 is identified by the row/column pair (m, n). Each of the MCUs are further subdivided into four data units. For example, the MCU 705 is subdivided into the data units 710, 711, 712, 713, which are collectively referred to herein as "the data units 710-713." Each of the data units includes a block of pixels. For example, the data unit 710 includes an 8×8 block of pixels including the pixel 715. As discussed herein, values of the pixels in the MCUs are retrieved from a system memory or cache (such as the memory 305 shown in FIG. 3) and concurrently compressed and downscaled to form a thumbnail image on a block-by-block basis.

The data units 710-713 are accessed in a Z-pattern as indicated by the lines 720, 725. The data units 710-713 are therefore accessed in the order indicated by the numerical order of the reference numerals 710-713. Partial values for scaling windows that overlap each of the data units in the MCUs are accumulated concurrently with compressing the pixel values in the MCUs. For example, the lower left data unit in the MCU indicated by the row/column pair (m, n+1) is overlapped by nine scaling windows 730 (only one indicated by a reference numeral in the interest of clarity) that are associated with corresponding destination pixels in a thumbnail image. Partial values for the scaling windows 730 are accumulated during processing of the values of the pixels in the data unit.

The partial values are stored in a local memory if a comparison of the boundaries of the scaling windows 730 and the boundaries of the data unit indicate that the contributions to the destination pixels of less than all of the pixels encompassed by the scaling windows 730 have been determined. A final value of a destination pixel is stored in the system memory if the comparison indicates that the contributions to the destination pixel of all of the pixels encompassed by the corresponding scaling window have been determined. For example, the central scaling window shown in FIG. 7 falls entirely within the lower left data unit of the MCU (m, n+1). The final value of the destination pixel associated with the central scaling window is therefore stored in system memory during or following processing of the pixels in the lower left data unit of the MCU (m, n+1).

Figure 8:
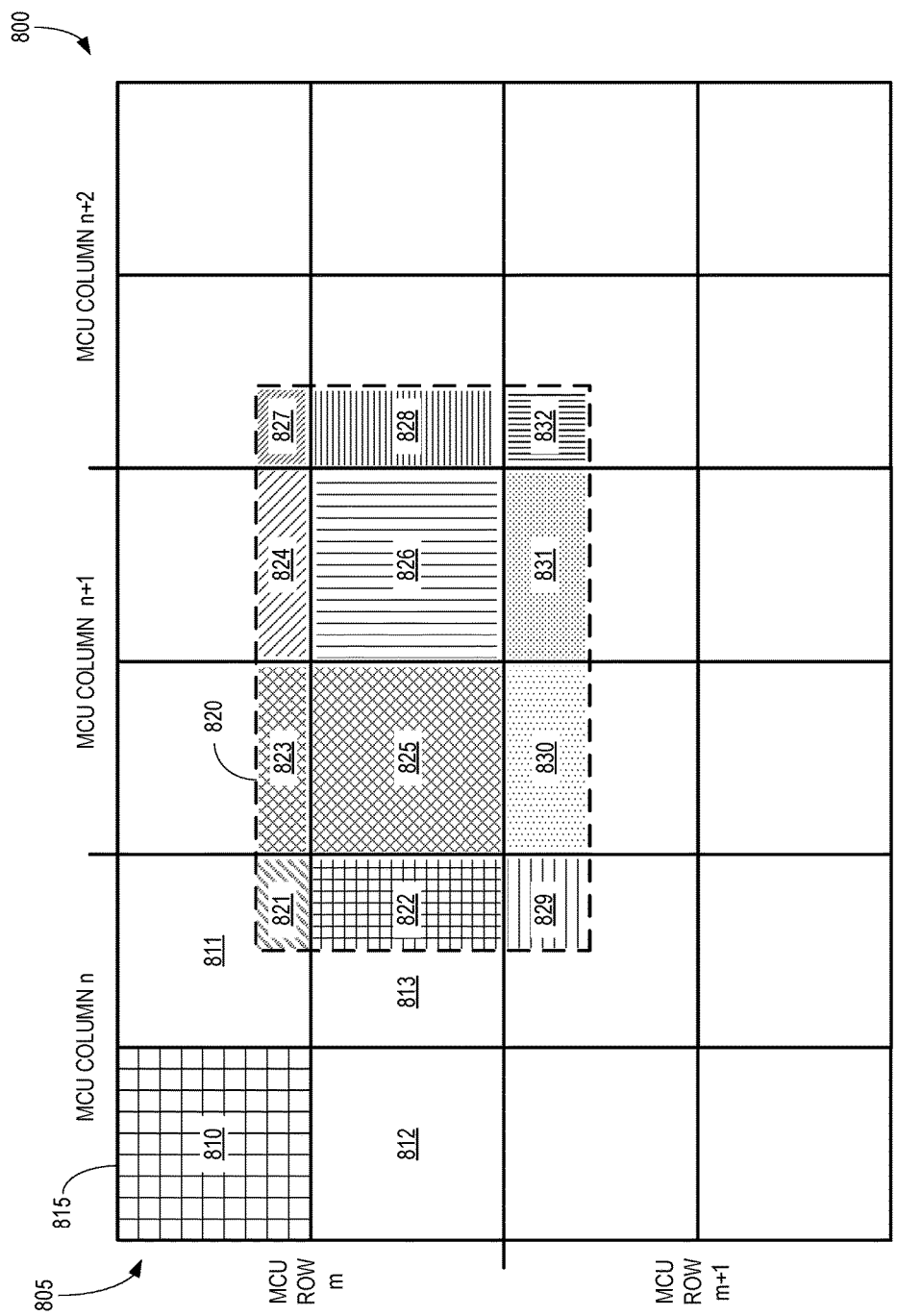
FIG. 8 is a diagram of a portion of an image that illustrates partial accumulations of a value of a destination pixel corresponding to a scaling window that encompasses multiple MCUs according to some embodiments.

FIG. 8 is a diagram of a portion 800 of an image that illustrates partial accumulations of a value of a destination pixel corresponding to a scaling window that encompasses multiple MCUs according to some embodiments. The image is divided into M rows and N columns of MCUs. For example, the image can include 16 rows and 16 columns as illustrated by the image 310 shown in FIG. 3. The portion 800 includes a subset of the MCUs that are identified by a subset of the rows (m, m+1) and a subset of the columns (n, n+1, n+2). For example, the MCU 805 is identified by the row/column pair (m, n). Each of the MCUs are further subdivided into four data units. For example, the MCU 805 is subdivided into the data units 810, 811, 812, 813, which are collectively referred to herein as "the data units 810-813." Each of the data units includes a block of pixels. For example, the data unit 810 includes an 8×8 block of pixels including the pixel 815. As discussed herein, values of the pixels in the MCUs are retrieved from a system memory or cache (such as the memory 305 shown in FIG. 3) and concurrently compressed and downscaled to form a thumbnail image on a block-by-block basis.

A scaling window 820 encompasses pixels in the portion 800 that contribute to a destination pixel in a thumbnail image. As discussed herein, values of the pixels encompassed by the scaling window 820 are interpolated from locations of the pixels to a location of the destination pixel and the interpolated value is accumulated with interpolated values of other pixels to determine a value of the destination pixel. Computation of the interpolated value for each pixel is performed concurrently with encoding blocks of the portion 800 to generate a compressed image, e.g., according to a JPEG compression algorithm. For example, interpolated values of pixels in the region 821 are accumulated in a partial value of the destination pixel concurrently with encoding the pixels in the data unit 811. The partial value of the destination pixel is then stored in local RAM. In response to retrieving the data unit 813 from the system memory, the partial value is retrieved from the local RAM and interpolated values of pixels in the region 822 are accumulated in the partial value of the destination pixel concurrently with encoding the pixels in the data unit 813. The partial value is then stored in the local RAM.

Concurrent computation of the interpolated values of the pixels and encoding of blocks of a portion 800 is performed on a block-by-block basis. For example, once encoding of the MCU 805 and computation of the contributions to the partial value of the destination pixel from the regions 821, 822 is complete, the MCU (m, n+1) is retrieved from the system memory and the partial value of the destination pixel is retrieved from the local RAM. The values of the pixels in the regions 823, 824, 825, 826 are interpolated to the location of the destination pixel and the interpolated values are accumulated in the partial value of the destination pixel. The accumulation is performed concurrently with encoding the corresponding data units in the MCU (m, n+1). The partial value is then stored in the local RAM. This process proceeds iteratively on a block-by-block basis until the contributions of all the pixels encompassed by the scaling window 820 are accumulated in the partial value. For example, concurrent interpolation, partial value accumulation, and encoding are performed for the pixels in the region 828 of the MCU (m, n+2), pixels in the region 829 of the MCU (m+1, n), pixels in the regions 830, 831 of the MCU (m+1, n+1), and pixels in the region 832 of the MCU (m+1, n+2). A final value of the destination pixel is stored in memory in response to detecting the boundary of the region 832.

Figure 9:
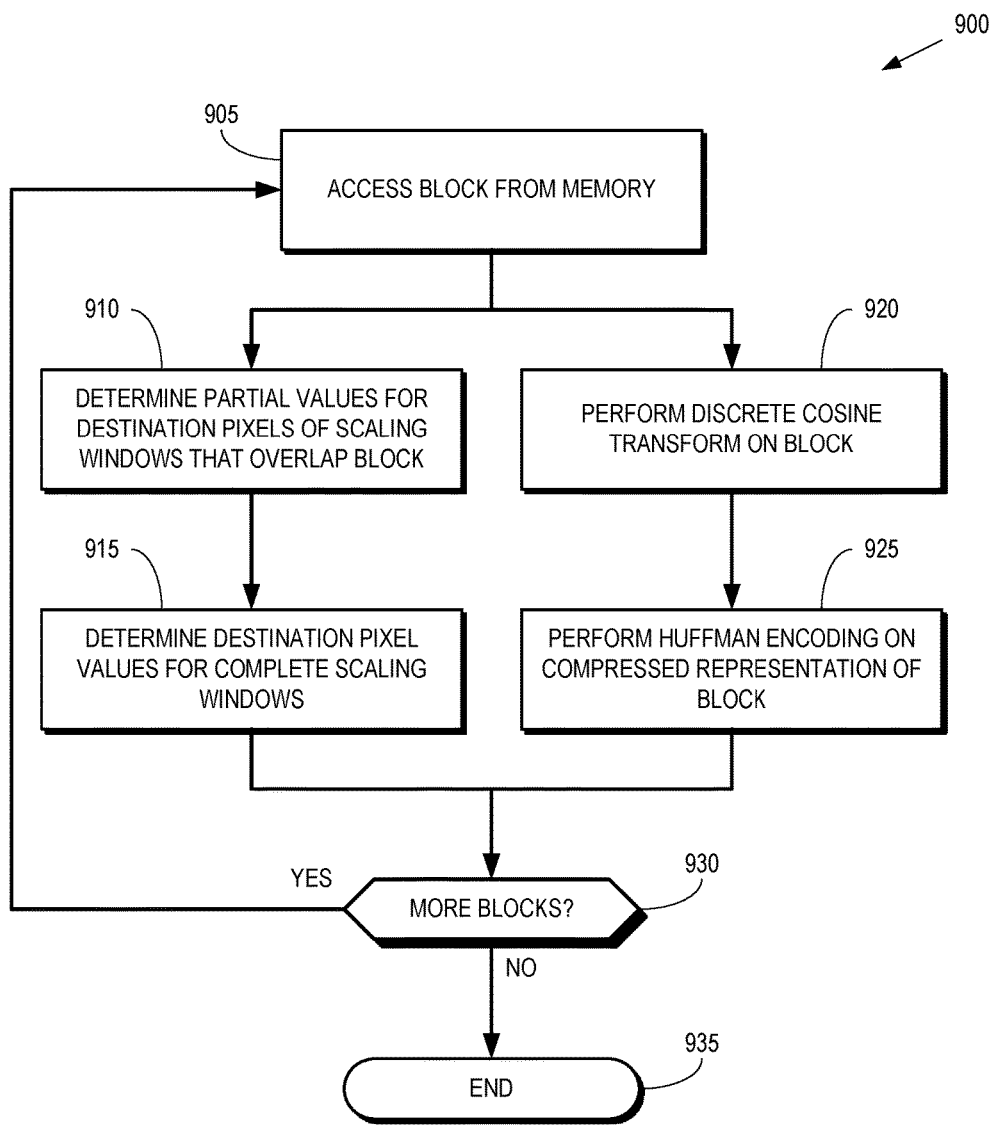
FIG. 9 is a flow diagram of a method for concurrent image compression and thumbnail generation according to some embodiments.

FIG. 9 is a flow diagram of a method 900 for concurrent image compression and thumbnail generation according to some embodiments. The method 900 is implemented in some embodiments of the processing system 300 shown in FIG. 3. For example, the method 900 can be implemented in a processor such as the processor 320 shown in FIG. 3.

At block 905, the processor retrieves values of a block of pixels representative of a portion of an image from a system memory or cache. The block of pixels can be a MCU, a data unit within an MCU, or other 2-D group of pixels.

At block 910, the processor determines partial values for destination pixels of scaling windows that overlap portions of the block. For example, as discussed herein, the partial values of the destination pixels can be determined by interpolating values of pixels in portions of the block from locations of the pixels to the locations of the destination pixels. The partial values are stored in a local memory, such as the local RAM 395 shown in FIG. 3, which is associated with the processor.

At block 915, the processor determines destination pixel values for complete scaling windows. For example, the partial value of a destination pixel is set equal to a final value of the destination pixel in response to the process to determining that all of the pixels in the image that contribute to the value of the destination pixel, i.e., all of the pixels in the image encompassed by the scaling window, have been processed by the processor. In some embodiments, the accumulated partial value is divided by the number of pixels that contribute to the value of the destination pixel to produce the final value. Final values of the destination pixels are stored in a memory such as the memory 350 shown in FIG. 3.

At block 920, the processor encodes values of the pixels in the block to form a compressed representation of the portion of the image represented by the pixels in the block. For example, the processor can perform an FDCT transform on the values of the pixels in the block, as discussed herein.

At block 925, the processor performs lossless encoding of the compressed representation. For example, the processor can perform Huffman encoding on the compressed representation of the portion of the image represented by the pixels in the block. As discussed herein, the operations in blocks 910, 915 are performed concurrently with the operations in blocks 920, 925. Thus, the values of the pixels in the block are only retrieved from the memory (at block 905) a single time or in a single pass.

At decision block 930, the processor determines whether there are additional blocks to be retrieved from the system memory or cache. If so, the method 900 flows to block 905 and the processor performs another iteration of the block-by-block image compression and thumbnail generation process. If not, the method 900 flows to block 935 and the method 900 ends.

Figure 10:
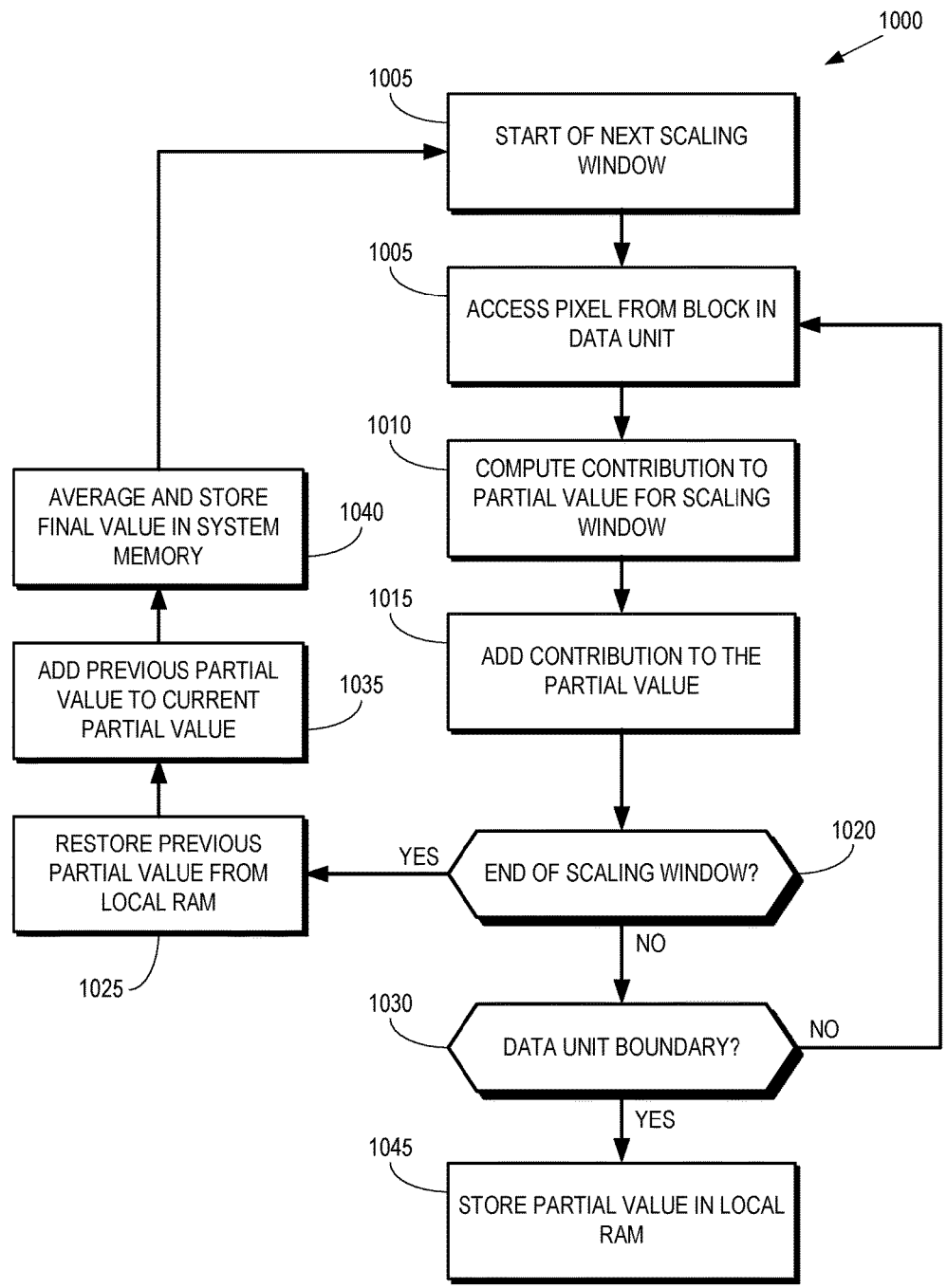
FIG. 10 is a flow diagram of a method of computing and storing partial values of destination pixels based on values of pixels in a block according to some embodiments.

FIG. 10 is a flow diagram of a method 1000 of computing and storing partial values of destination pixels based on values of pixels in a block according to some embodiments. The method 1000 is implemented in some embodiments of the processing system 300 shown in FIG. 3. For example, the method 1000 can be implemented in a processor such as the processor 320 shown in FIG. 3. The method 1000 is also used to perform some embodiments of the operations in the blocks 910, 915 shown in FIG. 9. The method 1000 is therefore performed on pixels in a block concurrently with encoding of the pixels in the block to generate a compressed representation of the image represented by the pixels.

At block 1001, the processor begins accumulating partial values representative of a value of a destination pixel associated with the next scaling window. Some embodiments of the processor initialize the partial value to a value of zero before beginning accumulation of the partial value.

At block 1005, the processor accesses a value of the pixel from a block that has been retrieved from a system memory or cache. In the illustrated embodiment, the block is a portion of a data unit that is currently being processed by the processor. The pixel is encompassed by the scaling window. Thus, the pixel is in a region that is encompassed by a union of the boundaries of the block or data unit and the boundaries of the scaling window. At block 1010, the processor computes the pixel's contribution to the partial value of the destination pixel. For example, the processor can interpolate the value of the pixel from a location of the pixel to a location of the destination pixel. At block 1015, the processor adds the contribution determined at block 1010 to the partial value of the destination pixel.

At block 1020, the processor determines whether the pixel in that block is at the end of the scaling window. For example, the processor can determine whether the pixel is at a boundary of the scaling window and whether all of the pixels encompassed by the scaling window have been previously processed, as discussed herein. If the pixel is the last pixel that needs to be processed to complete processing of all of the pixels encompassed by the scaling window, the method 1000 flows to block 1025. If the pixel is not the last pixel that needs to be processed to complete processing of all of the pixels encompassed by the scaling window, the method 1000 flows directly to decision block 1030 without storing any information in the memory.

At block 1025, a previous partial value representative of a value of the destination pixel is retrieved from the local RAM. For example, the previous partial value can be a partial value that was computed using pixels that are encompassed by a union of the scaling window and a data unit that was previously processed by the processor. At block 1035, the retrieved previous partial value is added to the partial value computed using the current data unit. At block 1040, the partial value is averaged to generate a final value for the destination pixel, e.g., by dividing by the total number of pixels that contributed to the partial value for the destination pixel, and the final value is stored in the system memory.

At decision block 1030, the processor determines whether a boundary of the current data unit has been reached. If not, the method 1000 flows to block 1005 and the next pixel from the block is accessed. If the boundary of the current data unit has been reached, the method 1000 flows to block 1045 and the partial value is stored in the local RAM. As discussed herein, the partial value can be subsequently retrieved from the local RAM for accumulation with a partial value computed for the scaling window using pixels from a different data unit.

In some embodiments, the apparatus and techniques described above are implemented in a system comprising one or more integrated circuit (IC) devices (also referred to as integrated circuit packages or microchips), such as the processing system described above with reference to FIGS. 1-10. Electronic design automation (EDA) and computer aided design (CAD) software tools are be used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device are be stored in and accessed from the same computer readable storage medium or a different computer readable storage medium.

A computer readable storage medium includes any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may be implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   retrieving values of a block of pixels representative of a portion of a digital image from a first memory;
   retrieving a partial value of a destination pixel in a thumbnail image from a second memory;
   concurrently compressing the values to generate a compressed image and modifying the partial value based on a portion of the block that overlaps a scaling window for the destination pixel;
   storing the modified partial value in the second memory; and
   storing the compressed image and the thumbnail image in a third memory.

2. The method of claim 1, further comprising:
   iteratively retrieving values of a plurality of blocks of pixels representative of a plurality of portions of the digital image, retrieving partial values of the destination pixels in the thumbnail image corresponding to the scaling windows that overlap the plurality of blocks of pixels, and concurrently applying the compression algorithm to the values and modifying the partial values on a block-by-block basis.

3. The method of claim 1, wherein modifying the partial value of the destination pixel comprises comparing boundaries of the block and boundaries of the scaling window to determine the portion of the block that overlaps the scaling window.

4. The method of claim 3, wherein modifying the partial value of the destination pixel comprises interpolating the values of the pixels in the portion of the block that overlaps the scaling window to a location of the destination pixel and accumulating the interpolated values in the partial value of the destination pixel.

5. The method of claim 3, wherein storing the modified partial value in the second memory comprises storing the modified partial value in response to a portion of the scaling window being outside the block and outside any blocks previously retrieved from the first memory.

6. The method of claim 1, wherein retrieving the partial value of the destination pixel from the second memory comprises retrieving the partial value in response to the scaling window overlapping the block of pixels retrieved from the first memory.

7. The method of claim 1, further comprising:
   setting a complete value of the destination pixel equal to the partial value in response to determining that an entirety of the scaling window has overlapped with the block or at least one block previously retrieved from the first memory.

8. The method of claim 7, wherein storing the thumbnail image comprises storing the complete value of the destination pixel in the third memory.

9. An apparatus comprising:
   a first memory to store values of blocks of pixels representative of a digital image;
   a second memory to store partial values of destination pixels in a thumbnail image;
   a third memory to store compressed images and thumbnail images; and
   a processor to:
      retrieve values of a block of pixels from the first memory,
      concurrently compress the values to generate a compressed image and modify a partial value of a destination pixel based on values of pixels in portions of the block that overlap a scaling window for the destination pixel,
      store the modified partial value in the second memory, and
      store the compressed image and the thumbnail image in the third memory.

10. The apparatus of claim 9, wherein the first memory and the third memory are at least one of a system memory or a cache that are connected to the processor by an interface characterized by a limited memory access bandwidth, and wherein the second memory is a local random access memory (RAM) associated with the processor.

11. The apparatus of claim 9, wherein the processor is further configured to:
    iteratively retrieve the values of the blocks of pixels representative of the digital image, retrieve the partial values of the destination pixels in the thumbnail image corresponding to the scaling windows that overlap the blocks, and concurrently apply the compression algorithm to the values and modify the partial values on a block-by-block basis.

12. The apparatus of claim 9, wherein the processor is further configured to compare boundaries of the block and boundaries of the scaling window to determine the portion of the block that overlaps the scaling window.

13. The apparatus of claim 12, wherein the processor is further configured to interpolate the values of the pixels in the portion of the block that overlaps the scaling window to a location of the destination pixel and accumulate the interpolated values in the partial value of the destination pixel.

14. The apparatus of claim 12, wherein the processor is further configured to store the modified partial value in response to a portion of the scaling window being outside the block and outside blocks previously retrieved from the first memory.

15. The apparatus of claim 9, wherein the processor is further configured to retrieve the partial value from the second memory in response to the scaling window overlapping the block of pixels retrieved from the first memory.

16. The apparatus of claim 9, wherein the processor is further configured to set a complete value of the destination pixel equal to the partial value in response to determining that an entirety of the scaling window has overlapped with the block or at least one block previously retrieved from the first memory.

17. The apparatus of claim 16, wherein the processor is further configured to store the complete value of the destination pixel in the third memory.

18. A method, comprising:
- defining a scaling window for a destination pixel in a thumbnail image representative of a digital image;
- retrieving a block of pixels representative of a portion of the digital image from a first memory;
- determining a partial value of the destination pixel based on a portion of the block of pixels that overlaps the scaling window concurrently with applying a compression algorithm to the block of pixels;
- storing the partial value in a second memory in response to a portion of the scaling window being outside the block and outside any blocks previously retrieved from the first memory; and
- storing the partial value in a third memory in response to determining that an entirety of the scaling window has overlapped with the block or at least one block previously retrieved from the first memory.

19. The method of claim 18, wherein determining the partial value comprises retrieving the partial value from the second memory in response to the scaling window overlapping the block of pixels retrieved from the first memory.

20. The method of claim 19, wherein determining the partial value of the destination pixel comprises interpolating the values of the pixels in the portion of the block that overlaps the scaling window to a location of the destination pixel and accumulating the interpolated values in the partial value of the destination pixel.

* * * * *